(12) United States Patent
Frisch

(10) Patent No.: US 6,536,801 B2
(45) Date of Patent: *Mar. 25, 2003

(54) GAS BAG MODULE

(75) Inventor: Ralph Frisch, Mömbris (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/861,256

(22) Filed: May 18, 2001

(65) Prior Publication Data

US 2001/0042979 A1 Nov. 22, 2001

(30) Foreign Application Priority Data

May 19, 2000 (DE) ...................................... 200 18 916 U
Jun. 16, 2000 (DE) ...................................... 200 10 726 U
Jul. 13, 2000 (DE) ...................................... 200 12 077 U

(51) Int. Cl.[7] .............................................. B60R 21/16
(52) U.S. Cl. ................. 280/743.1; 280/728.2; 280/728.3; 280/731
(58) Field of Search ..................... 280/731, 743.1, 280/728.3, 728.2

(56) References Cited

U.S. PATENT DOCUMENTS 3,618,979 A * 11/1971 Gulette ........................ 280/731
3,819,203 A * 6/1974 Radke et al. ................ 280/731
4,828,286 A * 5/1989 Fohl ......................... 280/728.2
5,125,682 A * 6/1992 Hensler et al. .......... 280/730.1
5,480,184 A * 1/1996 Young ..................... 280/728.3
6,042,147 A * 3/2000 Nishijima et al. .......... 280/731

FOREIGN PATENT DOCUMENTS

| DE | 31 45731 A1 | * | 5/1983 |
| DE | 19749914 | | 5/1999 |
| GB | 2 268 128 A | * | 1/1994 |
| WO | 9734783 | | 9/1997 |

* cited by examiner

*Primary Examiner*—Paul N. Dickson
*Assistant Examiner*—Ruth Ilan
(74) *Attorney, Agent, or Firm*—Tarolli, Sundheim, Covell & Tummino L.L.P.

(57) ABSTRACT

A gas bag module has a gas bag with a gas bag wall. The gas bag wall has a front wall which faces an occupant to be restrained and has a center section, and a rear wall with an inflation opening to connect to a gas generator. A fastener fastens the center section to the module and prevents the center section from a free movement so that a depression is formed by the center section. A module covering has an annular, predetermined outlet opening which surrounds the fastening. The module covering has a holding section encircled by the outlet opening. An emblem adjoins the holding section. The emblem is fastened to the module by the fastener which fastens the center section of the wall to the module.

13 Claims, 4 Drawing Sheets

GAS BAG MODULE

TECHNICAL FIELD

The invention relates to a gas bag module.

The invention relates in particular to a driver's or passenger's gas bag module with a large-volume bag which protects the head and the upper body in a frontal impact.

More particularly, the invention relates to gas bags having a depression and a ring section arranged so as to extend around this depression.

BACKGROUND OF THE INVENTION

Gas bags having a depression and an annular chamber formed thereby are distinguished by a small stress on the occupant which occurs when the occupant and the gas bag meet. In particular with an occupant who is sitting too close to the steering wheel for example, the unfolding gas bag can hit the occupant and exert stresses on him. In a conventional gas bag, the gas bag bulges out toward the occupant, so that the latter may undergo a reduced restraining effect by the gas bag when the occupant is sitting too close to the steering wheel. In addition, it can not be excluded theoretically that the occupant slides off the gas bag if the occupant is sitting too close to the steering wheel.

A gas bag module may have a heavy emblem of the vehicle manufacturer fastened to the outer side of the cover. In the case of the sudden swinging up of the module covering, it must be ensured that the emblem is held on the covering, which requires an increased expenditure.

BRIEF SUMMARY OF THE INVENTION

The invention faces the object of guaranteeing a simple manufacture of a gas bag module having an annular gas bag, in particular of providing for a reliable fastening of the center section.

This is achieved by a gas bag module which comprises a gas bag with a gas bag wall, the latter including a front wall which faces an occupant to be restrained and which has a center section, and including a rear wall with an inflation opening to connect to a gas generator. The gas bag module also comprises a fastener which holds the center section in a fully inflated state of the gas bag fastened to the module and, upon inflation of the gas bag, prevents the center section from a free movement towards outside of said module, so that a depression is formed by the center section. The gas bag module further comprises a module covering which is opened in a case of restraint for an emergence of the gas bag, the module covering having an annular, predetermined outlet opening which surrounds the fastener. The module covering has a holding section encircled by the outlet opening, and an emblem being provided adjoining the holding section. This emblem is visible from outside, is configured as a separate part and is fastened to the module by the same fastener which fastens the center section to the module. According to the invention, the emblem is fastened to the module to prevent part of the center section from emerging from the module.

In the gas bag module proposed, the fastener which fastens the emblem to the module, has a further function, in that it prevents the center section from an unimpeded movement out of the module, so that a separate fastener for the center section is no longer necessary. In addition, in the gas bag module proposed there is no need for the heavy emblem to fold outwards, so that no danger originates with the emblem, because it is in fact provided on the holding section of the module covering which does not swivel outwards. As a result, the swivelled open flaps on the rest of the module covering does not have to be so stable because the flaps have no heavy emblem and they are a smaller size than in the prior art.

The region of the module covering, which lies inwards of the outlet opening, i.e. is surrounded by it, represents a holding section which forms the fastening of the center section. The holding section therefore has a dual function by on the one hand serving for the restraint of the center section and on the other hand for fastening the flaps to the module covering.

The holding section is preferably fastened to a retainer in the gas bag module, e.g. a cage surrounding the gas generator, which in turn is fastened to the gas generator, to the module housing or for example to a gas generator holding plate, i.e. to a very stable part connected as directly as possible with the vehicle.

The depression with the center section does not have to be a perfectly circular opening, as seen onto the front wall. An embodiment makes provision that in the fully inflated state, viewed onto the front wall, a slit-shaped opening is produced, i.e. a slit-shaped region is formed as transition from the ring section of the front wall to the depression. This means that the depression closes increasingly, starting from the fastener in the region of the covering toward the ring section. This geometry in the fully inflated state of the gas bag can be achieved by a corresponding shape of the gas bag wall in the region of the depression (also designated as the inner gas bag wall) and a corresponding blank of the adjoining, outer gas bag wall or front wall. Furthermore, it is also possible that the depression in the fully inflated state is closed towards the front wall, by the gas bag wall, which delimits the depression, extending radially inwards until opposite sections of the gas bag wall contact each other. In this case, the depression becomes increasingly narrow, starting from the fastener to the ring section, and is finally closed.

The manufacture of the gas bag in the region of the deep depression may possibly be a problem. This depression could for example consist of a piece of fabric sewn to form a tube, the problem then consisting here, however, in fastening this piece of fabric to the remainder of the front wall (ring section). An embodiment of the invention provides for a simple manufacture of the gas bag provided in the gas bag module proposed by the depression being delimited by an inner gas bag wall which consists of at least two wall parts, namely a forward and a rearward wall part. The forward wall part, i.e. the wall part closer to the front side, has an annular blank and is connected by its inner edge with the inner edge of the ring section of the front wall, with the inner edges delimiting an opening for the formation of the center section. The rearward wall part, i.e. the wall part closer to the rear wall, is connected with the outer edge of the forward wall part, preferably with its own outer edge. The fastener which prevents the center section from turning outwards, engages in this embodiment on the rearward wall part. In this development, the gas bag looks like two gas bags fitted into each other, in which the inner gas bag is inserted via the opening on the ring section into the outer gas bag. This embodiment is distinguished on the one hand by a simple manufacture, in particular a simple sewing of the wall parts. On the other hand, it has been found surprisingly that this gas bag offers better restraint values than a gas bag in which the center section is formed by a tube.

To sum up, in the module proposed, the gas bag will remain fastened permanently, in the region of the center section, directly to the module or close to the module, i.e. preferably the module housing. The gas bag is then annular in shape and pushes outwards via an annular flap arrangement.

DETAILED DESCRIPTION OF THE PREFERRED EMBODIMENTS

Figure 1:
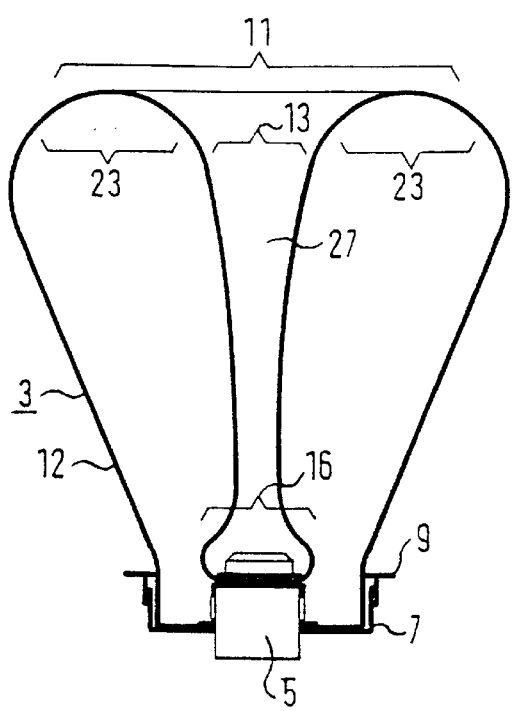
FIG. 1 shows a cross-sectional view through a first embodiment of the gas bag module according to the invention.
Figure 2:
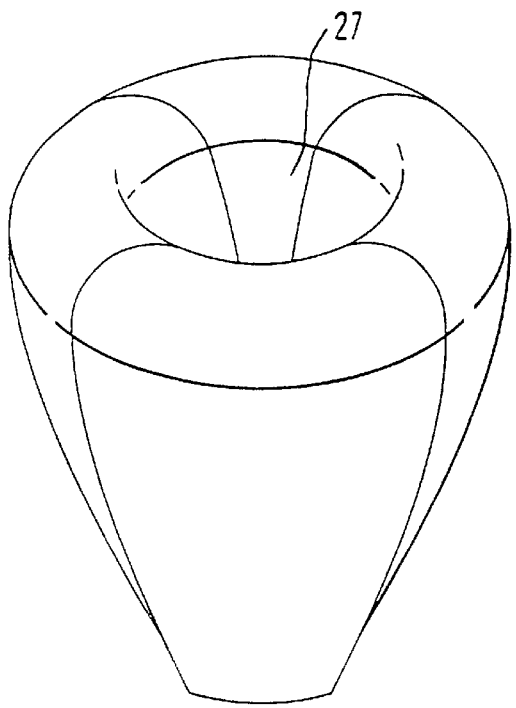
FIG. 2 shows a perspective view from above of the gas bag module according to the invention according to FIG. 1.

In FIG. 1 a gas bag module is shown, housed in the vehicle steering wheel or in the instrument panel on the passenger side and serving to restrain the head and upper body, which module consists of a gas bag 3, a gas generator 5, a module housing 7 in which gas bag 3 and gas generator 5 are housed, and a module covering 9. The gas bag module according to FIG. 1 is in particular a module housed in the steering wheel of a vehicle.

The gas bag 3 consists of a gas bag wall of fabric material, with a front wall 11 which faces the occupant when the gas bag is inflated, as illustrated in FIG. 1, and which is touched by the occupant. In addition, a rear wall 12 is provided, which may consist of a separate fabric piece which has an inflation opening 21, via which the gas generator 5 is introduced into the gas bag 3. The front wall has in addition a so-called center section 13, which is defined by a deep depression 27 and the deepest region 16 of which is arrested on the covering 9 or a retainer 33 of the gas generator 5 directly and permanently by a fastener. The fastener is an emblem 15 with a formed-on screw 17, which is screwed externally on the covering 9 or on the mounting in the form of the retainer 33 which is configured like a cage.

Figure 3:
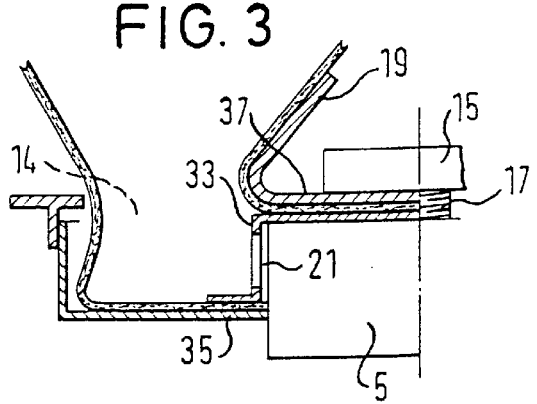
FIG. 3 shows an enlarged sectional view through a left-hand lower half of the gas bag module in the region of the gas generator.

The covering 9 has opening flaps 19 adjoining each other in a ring shape around the center section, which flap s 19 are swung upwards when the gas bag unfolds (see FIG. 3). In the opened state an annular outlet opening 14, preferably in the form of a circular ring, in the covering 9 is exposed.

The fastener in the form of the emblem provides for the depression and holds the center section, in particular the region 16 of the center section lying closest to the gas generator 5, close to the gas bag module. A ring section 23 which surrounds the center section 13 and forms the remaining part of the front wall 11, has a greater distance from the covering 9, so that the gas bag has a much greater depth than in the region of the center section 13, the gas bag in the embodiment shown having no depth at all in the center, because it remains in the part of the center section 13 lying immediately under the emblem 15 in its original position which it also assumed in the folded or inflated state and does not move at all in this region in the direction toward the occupant.

Inwards of the ring section 23, the depression 27 in the center of the front wall is produced, which depression, as tests have shown, has a positive influence on the restraining effect. Through the fact that the center section 13 of the gas bag is prevented from emerging from the module, only the ring section 23 can contribute to the opening of the flaps 19, the force generated on inflation being principally directed radially outwards, so that the gas bag unfolds principally radially at the start of its unfolding process and the movement in the direction toward the occupant is small. In the central region of the center section, no movement at all is possible in the direction to the occupant, so that the stressing of the occupant by the gas bag 3 is reduced. In previous gas bags the center section which moves rapidly outwards is that part of the gas bag wall which represents the greatest stress for the occupant, when the occupant and the gas bag wall hit each other.

FIG. 3 shows the clamping of the gas bag 3 in the region of the inflation opening 21. The gas bag is clamped by the cup-shaped retainer 33 of the gas generator on the flange 35 of the gas generator 5. 37 designates the so-called holding section of the covering 9, which lies inwards of the annular outlet opening 14 and which together with the emblem 15 forms the fastening of the center section 13. The opening flaps 19 in the embodiment illustrated are formed on the inner periphery of the annular outlet opening 14.

Figure 4:
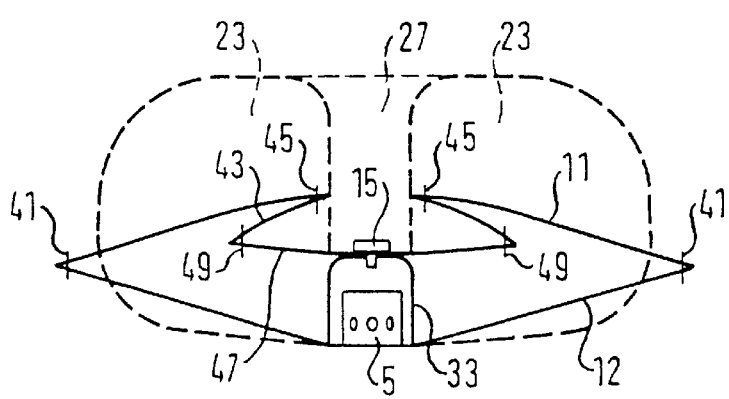
FIG. 4 shows a cross-sectional view through a gas bag module according to a second embodiment, with the gas bag partially and fully unfolded.

In the embodiment illustrated in FIG. 4, the cage-shaped retainer 33 surrounding the gas generator 5, and also the fastening of the center section 13 via the emblem 15 on the retainer 33 can be seen again. The front wall 11 consists of a ring-shaped fabric section which is connected at its outer edge with the rear wall 12 by means of a seam 41. On the inner edge of the ring section 23, which delimits the opening in the ring section 23 and co-defines the center section 13, the ring section is sewn with the inner edge of a forward wall part 43 having an annular shape. A corresponding peripheral seam is designated by 45. Adjoining the forward wall part 43 is a rearward wall part 47, which is connected at its outer edge by means of a peripheral seam 49 with the outer edge of the forward wall part 43. The rearward wall part 47 is the region which is also fastened to the retainer 33 in the region of its center. The wall parts 43, 47 form an inner gas bag wall. In the fully unfolded state, which is illustrated by broken lines, the abrupt, deep depression 27 can be readily seen, which is delimited by the forward and rearward wall parts 43, 47.

Figure 5:
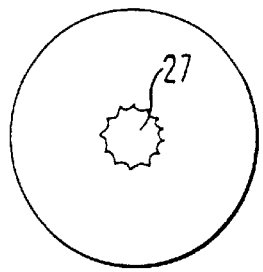
FIG. 5 shows a top view onto the fully unfolded gas bag illustrated in FIG. 4, FIGS. 6 and 7 show two variants for the design of flaps forming a covering.

By the blanks being cut in the shape of a circle (wall part 47) and ring (wall part 43), respectively, folds are produced in the fully inflated state in the region of the depression 27 which are symbolized in FIG. 5 by the zigzag line which delimits the depression 27. However, this irregular folding is probably advantageous as regards the restraining effect, because the gas bag which is thus constructed achieves better restraining effects than a gas bag in which the depression 27 is formed by a cylinder produced from fabric material which does not have any folds in the inflated state, because the folds constrict the cross-section and increase the stability of the inflated airbag.

Figure 6:
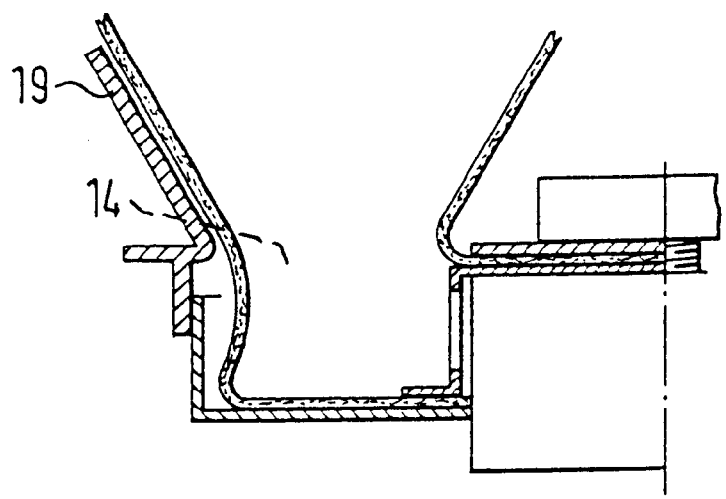
Figure 7:
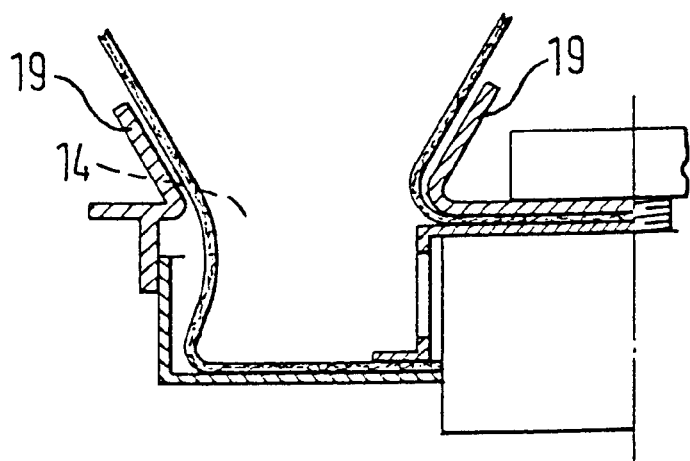

In FIGS. 6 and 7 two variants are illustrated for the construction of the opening flaps 19. According to FIG. 6, all the flaps 19 are formed on the outer periphery of the outlet opening 14. In the variant shown in FIG. 7, flaps 19 associated with each other are provided on the inner and outer periphery of the outlet opening 14. The oppositely arranged flaps 19 cover each approximately half the radial extent of the annular outlet opening. This variant has the advantage that the flaps 19 have a shorter overall length as compared with the flaps shown in the FIGS. 3 and 6. On opening, therefore, each individual flap has a comparatively low kinetic energy and in addition does not project so far into the passenger space, so that the risk of injury to the vehicle occupant by the flaps 19 in a possible secondary impact is reduced.

Figure 8:
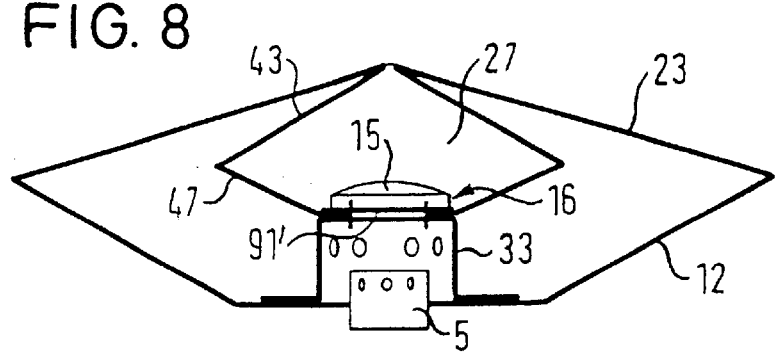
FIG. 8 shows a diagrammatic cross-sectional view through a gas bag module according to a further embodiment with a gas bag not yet fully inflated.

In the embodiment according to FIG. 8 it can be seen that the depression 27 tapers from the lowest region 16, i.e. the part of the front wall which does not leave the gas bag module on inflation, to the ring section 23, and is closed completely or almost completely, so that from outside no opening or only a small opening can be seen, which forms the transition of the ring section to the center section 13 and hence to the depression 27.

Figure 9:
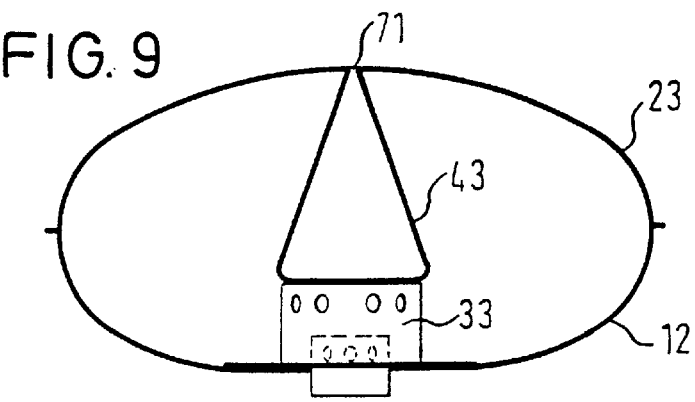
FIG. 9 shows the gas bag module according to FIG. 8 with fully inflated gas bag.

In FIG. 9 the fully unfolded gas bag is shown, which has an almost closed form toward the vehicle occupant.

Figure 10:
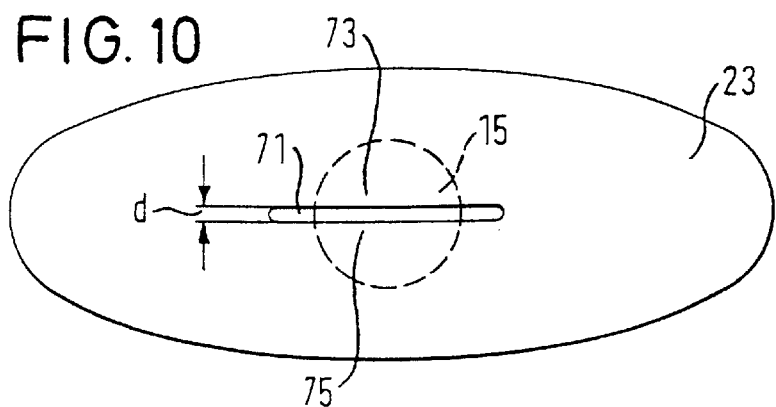
FIG 10 shows a top view of the front wall of the fully inflated gas bag in FIG. 9.
Figure 11:
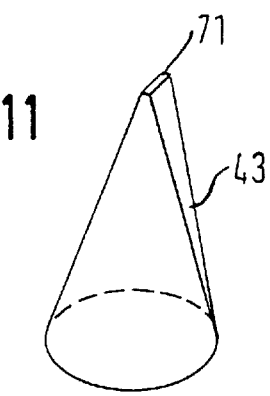
FIG. 11 shows a perspective view of the inner gas bag wall used in the gas bag module according to FIGS. 9 to 11.

In FIG. 10 it can be seen that the ring section 23 extends around a slit 71 which has a small thickness d. The ring section 23 has an elliptical shape which is formed in that the blank for the ring section 23 is already elliptical and has a region provided with the slit 71. The slit 71 must be so large that on tearing open of the covering it can slide along the emblem 15 and the part of the covering which lies immediately beneath the emblem 15, and can move out from the gas bag module.

The blank of the gas bag wall and of the individual wall parts can also be selected such that with a fully inflated gas bag the slit 71 is closed, which means that opposite sections 73, 75 come to lie on each other and close the depression towards the ring section. The thickness d is therefore 0.

In FIG. 1 the inner gas bag wall, consisting of two wall parts 43, 47 in accordance with FIG. 4, can be seen with a fully inflated gas bag, the slit 71 also being shown, which forms the transition from the ring section 23 to the center section 13.

The assembly of the gas bag module must take place such that on the one hand the part of the center section 13 held on the covering 9 also in fact is prevented from emerging from the gas bag module. On the other hand, it must be achieved that the entire adjoining part of the gas bag wall can emerge from the gas bag module and from the covering. It must therefore be prevented that apart from the central part of the center section other parts of the gas bag wall are clamped by the fastening of the restrained part of the center section.

Figure 12:
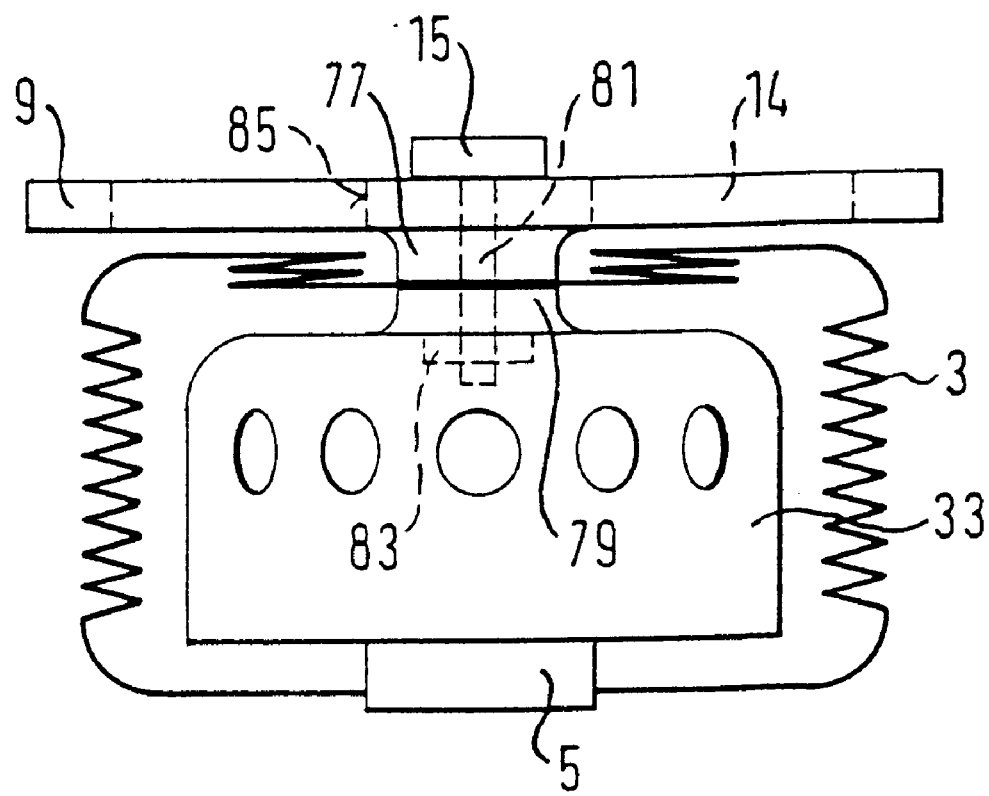
FIG. 12 shows a side view of a detail of the gas bag module with module covering and retainer of the gas generator, including a special variant of the fastening of the module covering to the retainer

In FIG. 12 it can be seen that the covering 9 has on its inner face a projection 77 in the form of a cylinder, which is formed on and projects to the inside, and which has the same outer diameter as a convexity 79 formed on the upper end wall of the casing 33. The projection 77 and the convexity 79 lie against each other and clamp between them that part of the center section of the gas bag which is prevented from emerging from the gas bag module. A screw 81, formed on the emblem 15 and defining an emblem fastening, protrudes through the slit 71 and is fixed on the inside of the retainer 33 with a nut 83. The region of the gas bag wall which forms the edge of the slit 71 runs around the emblem 15 and around the projection 77. It may also lie radially outside the inner edge 85 of the outlet opening 14, this also being able to be achieved by a correspondingly large projection 77. Another possibility consists in that for example the projection 77 in the lower region has the form of the later slit 71 and widens outwards to the emblem 15, so that the gas bag in the region of the slit 71 widens like a button hole on emerging from the module and then, after emerging, narrows again to the slit 71. FIG. 12 shows that the emblem fastening together with the holding section serve for securing the lowest end of the center section to the module, more precisely to the retainer 33.

Figure 13:
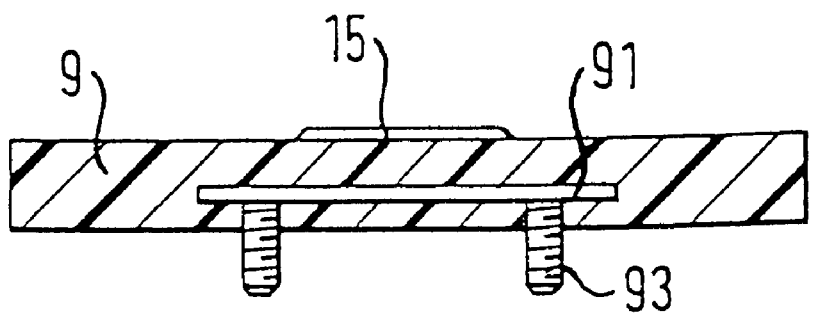
FIG. 13 shows a cross-sectional view through the covering with the fastening integrated t herein, which can be used in a gas bag module according to the invention.

In FIG. 13 a gas bag holding plate 91, embedded into the covering 9, is illustrated with two formed-on threaded pins 93 which form the fastening for the center section 13, by the threaded pins 93, in a similar manner to FIG. 12, projecting through the end wall of the retainer 33.

A further embodiment makes provision that the emblem 15 is constructed as a separate part and is connected with a gas bag holding plate 91' according to FIG. 8, provided outside the covering 9, or continues in one piece into this.

Two methods are considered for equipping the gas bag module with the gas bag. The first method makes provision that the covering 9 is constructed as a cup-shaped cap into which the gas bag is folded, it having to be taken into account in this type of folding that, proceeding from FIG. 12, only that part of the gas bag wall is allowed to lie against the end wall of the projection 77 which is to be held back. The remaining part of the center section then lies against the covering surface of the projection 19. On inserting of the gas bag, a so-called dummy serves as substitute for the retainer 33. After the insertion of the gas bag, the dummy is replaced by the retainer 33, and the nut 83 is screwed on. A further embodiment makes provision that the gas bag module consists of two cup-shaped parts, a cup-shaped cap forming the covering 9 and a cup-shaped receiving part. The retainer 33 is placed into the receiving part so that between the peripheral wall of the receiving part and the retainer 33 an annular space is formed, into which the gas bag is folded from above. After the insertion of the gas bag, the covering 9 is put in place from above and, for example, is screwed from below.

What is claimed is:
1. A gas bag module comprising:
 a gas bag with a gas bag wall, the latter including a front wall which faces an occupant to be restrained, the front wall having a center section, the gas bag including a rear wall with an inflation opening for a gas generator,
 a fastener fastening said center section to said module, said fastener in a fully inflated state of said gas bag, restraining said center section and, preventing said center section from moving away from said module, so that, upon inflation of said gas bag, a depression is formed by said center section,
 a module covering opened upon inflation of said gas bag, said module covering having an annular, predetermined outlet opening which surrounds said fastener, said module covering having a holding section encircled by said outlet opening, said holding section overlying said center section, an emblem adjoining said holding section, and being visible from outside the module and configured as a separate part, the emblem being fastened to said module by said fastener over said holding section and said center section, said center section of said gas bag being clamped by said emblem and said fastener to press said holding section and said center section into engagement with each other.

2. The gas bag module according to claim 1, further comprising a gas generator and wherein a gas bag retainer is provided in said gas bag module, said holding section being fastened to said retainer and wherein said gas generator at least partly protrudes into said retainer.

3. The gas bag module according to claim 2, wherein said center section is clamped immediately between said holding section of said cover and said retainer.

4. The gas bag module according to claim 2, wherein said module has a module housing and wherein said retainer is fastened on a rear side to one of said gas generator and said module housing.

5. The gas bag module according to claim 1, wherein flaps are provided which adjoin each other and are formed in one piece on said module covering, said annular outlet opening being closed by said flaps.

6. The gas bag module according to claim 5, wherein said flaps are formed on at least one of an inner and outer periphery of said annular outlet opening.

7. The gas bag module according to claim 1, wherein said fastener of said center section is designed to prevent part of said center section of said gas bag from emerging from said gas bag module.

8. The gas bag module according to claim 7, wherein said fastener of said center section comprises a gas bag holding plate located outside said gas bag.

9. The gas bag module according to claim 8, wherein said gas bag holding plate is embedded in said module covering.

10. The gas bag module according to claim 8, wherein said emblem, configured as a separate part, is connected with said gas bag holding plate.

11. The gas bag module according to claim 1, wherein said front wall has a ring section with an elliptical outer edge.

12. The gas bag module according to claim 1, wherein, said depression is defined by an inner gas bag wall which consists of at least a forward and a rearward wall part, said forward wall part being cut in an annular shape with an inner edge connected with an inner edge of said front wall, said inner edges defining an opening to form said center section, said rearward wall part being connected with an outer edge of said forward wall part, and said fastener engaging on said rearward wall part.

13. The gas bag module according to claim 1, wherein a screw is formed on said emblem which defines said fastener for said holding section and said center section.

* * * * *

UNITED STATES PATENT AND TRADEMARK OFFICE
CERTIFICATE OF CORRECTION

PATENT NO. : 6,536,801 B2
DATED : March 25, 2003
INVENTOR(S) : Ralph Frisch

It is certified that error appears in the above-identified patent and that said Letters Patent is hereby corrected as shown below:

<u>Title page,</u>
Item [30], Foreign Application Priority Data, delete "200 18 916U" and insert -- 200 08 916U --.

Signed and Sealed this

Fourth Day of November, 2003

JAMES E. ROGAN
*Director of the United States Patent and Trademark Office*